United States Patent [19]
Shapiro

[11] Patent Number: 5,233,655
[45] Date of Patent: Aug. 3, 1993

[54] DATA ACCESS VERIFICATION SYSTEM

[76] Inventor: Sanford S. Shapiro, 200951 Ingomar St., Canogo Park, Calif. 91304

[21] Appl. No.: 657,440

[22] Filed: Feb. 19, 1991

[51] Int. Cl.$^5$ .................. H04K 1/00; H04K 9/00; G07D 7/00

[52] U.S. Cl. .................. 380/23; 340/825.34; 380/25

[58] Field of Search .................. 235/382; 340/825.34; 380/21, 23, 25, 42, 43

[56] References Cited

U.S. PATENT DOCUMENTS

| | | | |
|---|---|---|---|
| 3,794,813 | 2/1974 | Spetz | 235/380 |
| 4,123,747 | 10/1978 | Lancto | 235/380 |
| 4,214,230 | 7/1980 | Fak et al. | 235/380 |
| 4,283,599 | 8/1981 | Atalla | 235/380 |
| 4,800,590 | 1/1989 | Vaughan | 380/25 |
| 5,022,080 | 6/1991 | Durst et al. | 380/23 |

Primary Examiner—Stephen C. Buczinski
Attorney, Agent, or Firm—Arthur Freilich; Robert D. Hornbaker; Leon D. Rosen

[57] ABSTRACT

A system is provided for enabling use of a password or PIN (personal identification number) to prove authority for access to a data base, where the PIN cannot be safely transmitted to a verifying authority. The PIN is entered into a calculating circuit which produces a TPIN (translated PIN) which can be safely transmitted to the verifying authority. The TPIN has fewer digits than the PIN to avoid a one-to-one correspondence of each PIN to each TPIN. For example, a six digit PIN may yield a three digit TPIN. The present time is also entered into the calculating circuit and an algorithm for generating the TPIN uses the present time, so for a given PIN the TPIN repeatedly changes.

13 Claims, 1 Drawing Sheet

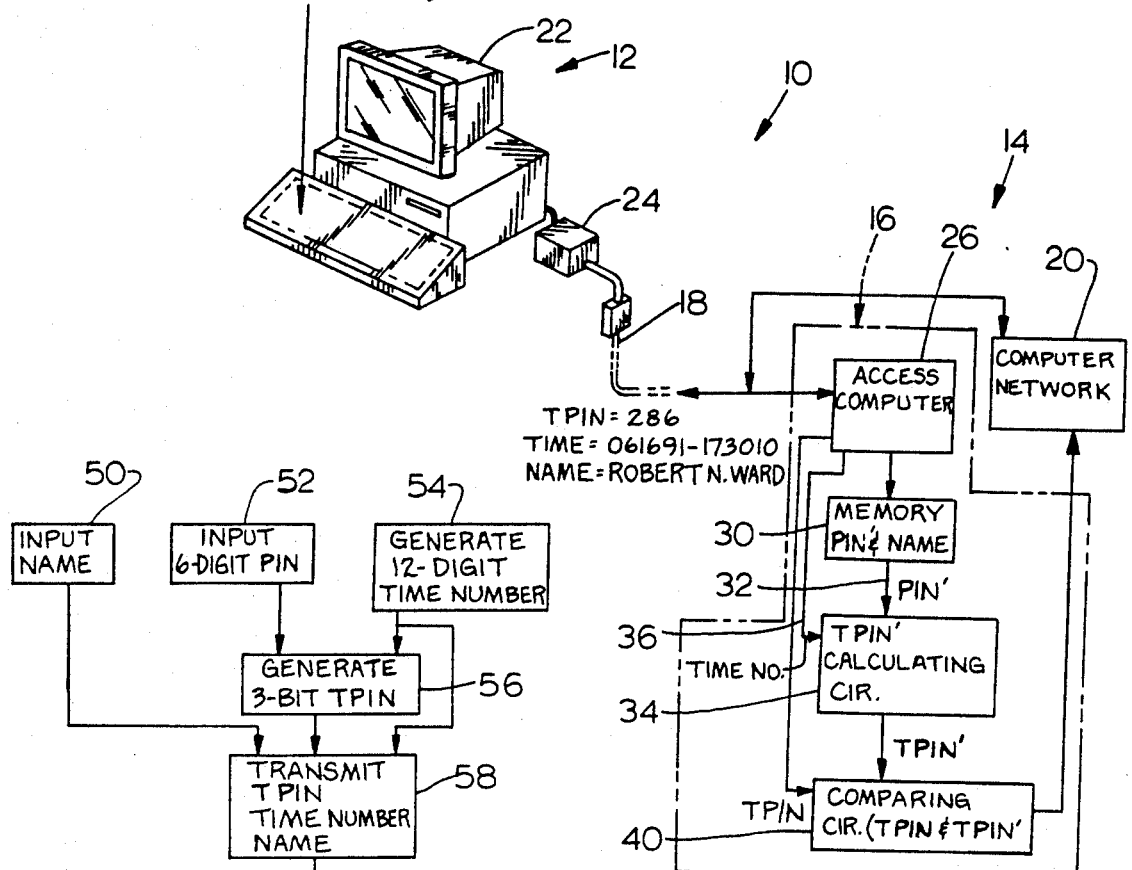
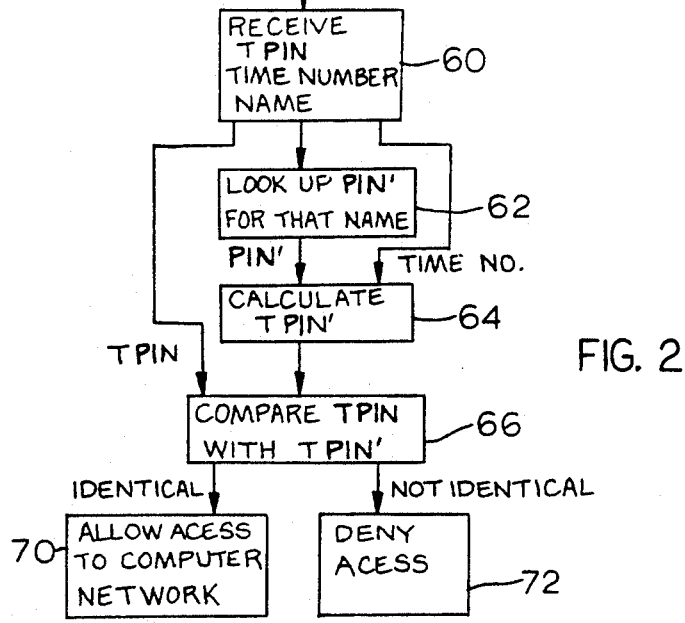
FIG. 1
FIG. 2

DATA ACCESS VERIFICATION SYSTEM

BACKGROUND OF THE INVENTION

Data bases, such as those with large amounts of stored information or which are part of an electronic mail system, often limit access by requiring an alleged authorized user to provide the proper password. The password may be the same for all authorized user's, or may be unique to each authorized user (in which case the authorized user also gives his identity). Fraudulent access to data bases is often the result of an unauthorized person learning the password by monitoring the telephone line between an authorized user and the data base. A system which prevented an unauthorized person, who taps a telephone line or other channel extending between an authorized user and a data base, from using information gained by tapping the line to gain access to the data base, would be of considerable value.

SUMMARY OF THE INVENTION

In accordance with one embodiment of the present invention, a system is provided that allows use of a password or personal identification number, both of which are referred to herein as a "PIN", to verify authority to gain access to a data base, but which keeps the PIN secure. The PIN is entered into a calculating circuit which uses the PIN to calculate a TPIN (translated pin). The TPIN can be transmitted over an unsecure telephone line or other channel to a verifying station that can verify whether or not the alleged authorized user has authority. The TPIN preferably has fewer digits than the PIN, to avoid a one-to-one correspondence of each PIN and each TPIN. For example, where a PIN has six digits, the calculating circuit may produce a TPIN with three digits. In addition, the calculating circuit receives the present time (from an internal or external clock) and uses this in its calculation of the TPIN. As a result, the TPIN transmitted over the unsecure line, will be valid for only a limited time. That is, when the computing circuit calculates a TPIN at a later time, it will generate a different TPIN. Any other non-repeating number can be used instead of the time, and the verifying station can prevent the same nonrepeating number, referred to herein as a "time number" from being used more than once for each PIN, as by having the verifying station generate the time number.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial perspective view and partial block diagram of apparatus of the present invention, with one example being indicated.

FIG. 2 is a block diagram showing a method by which an alleged user's authority can be verified.

DESCRIPTION OF THE PREFERRED EMBODIMENTS

FIG. 1 illustrates parts of a system 10 which allows an authorized user 12 to gain access to a data base 14. The data base 14 includes an authorizing station 16 which is connected through an unsecured line 18 to the user 12, and which functions to make sure that an alleged authorized user is really authorized. Upon such verification, the authorizing station 16 permits access to any of a variety of different types of data, such as a computer network 20 in which information is stored that can be transmitted to the user. Another type of data base is a main frame computer that is part of an electronic mail system, wherein an authorized user can post a message to be transmitted to certain computers that are to receive the mail. Still another type of data base, is one which keeps track of credit, and which can authorize a merchant to extend credit to a purchaser, as through a credit card.

In the particular system shown, the authorized user 12 includes a computer 22 into which has been entered a personal identification number, or PIN which, in this case, is the six digit number "977919". Also, the name of a person who is an authorized user has been entered, that name being "ROBERT N. WARD". The computer uses the PIN to generate a TPIN (translated pin) which, in this case, is the number "286". In generating the TPIN, the computer uses an algorithm, with variables being the PIN and the present time. The present time is assumed to be Jul. 16, 1991, at ten seconds after 5:30 p.m., which can be translated into the twelve digit number "07/16/91-17/30/10". The TPIN, the particular time used in calculating it, and the name of the authorized user, are all transmitted from the computer 22 through a modem 24 and through the unsecured telephone line 18 to the verifying station 16.

At the verifying station 16, the information on the telephone line 18 is delivered to an access computer 26 which delivers the name of the alleged authorized user "Robert N. Ward" to a memory 30. The memory 30 has previously stored the name and corresponding PIN of each authorized user with the PIN stored at the verifying station sometimes being herein designated as the "PIN'" to differentiate it from the "PIN" received over the telephone line 18 from an alleged authorized user. The memory 30 delivers the PIN' over line 32 to a calculating circuit 34. The calculating circuit 34 also receives the time transmitted over the telephone line 18 from the alleged authorized user. The calculating circuit 34 calculates a station generated TPIN which is sometimes designated herein as a TPIN' based on the PIN' stored in the memory for the name given (Robert N. Ward), and the time transmitted by the alleged authorized user. The TPIN' is delivered to a compare circuit 40 which compares the TPIN received from the alleged authorized user with the TPIN' generated by the access computer of the verifying station. If the TPIN is the same as the TPIN', then the verifying station 16 notifies the computer network 20 to provide access to the alleged authorized user.

While the PIN in this example has six digits, the TPIN has only three digits. Because the TPIN has fewer digits than the PIN, there is no one-to-one correspondence between each TPIN and each PIN. If the TPIN had the same number of digits as the PIN, there would be a one-to-one (or one-to-a-few) correlation between them, leading to the danger that a fraudulent person could determine how to obtain a PIN from a TPIN. An unauthorized person who learns the algorithm by which a PIN is used to generate a TPIN, might be able to derive the PIN from the TPIN, if there was a one-to-one correspondence between them. However, even with full knowledge of such an algorithm, knowledge of a TPIN leads only to generating 1,000 different possible PINs, where the PIN has six digits and the TPIN has only three digits. The fact that the TPIN contains far less information than the PIN prevents a determination of the PIN from the TPIN.

The use of the present time in the algorithm for calculating a TPIN from a PIN, is useful to keep the system secure. That is, if an unauthorized person learns the TPIN being sent over a telephone line to a verifying station at a particular time, that TPIN will not be useful at a later time. At any later time, the PIN of the authorized person will result in a different TPIN. Other safeguards, described below, are used to prevent an unauthorized person from using an intercepted TPIN.

A better understanding of how the present system works can be gained from considering the following example of one algorithm by which a TPIN (translated pin) can be obtained from a PIN. This example assumes that the PIN is "977919" and that the present time is "07/16/91-17/30/10" (Jan. 16, 1991 at 5:30 p.m. plus ten seconds).

$TPIN$ = last three digits of $\overline{TPIN}$  Eg. 1

$\overline{TPIN} = [(A + 1)C + (D + 1)E + (B + 1)KT]T + CT + K$ where
PIN=977919 and the time is 07/16/91-17/30/10
$\overline{A}$ = 1st digit of PIN + 1 = 9 + 1 = 10
A = Last digit of $\overline{A}$ = 0
$\overline{C}$ = 2nd digit of PIN + 4 = 7 + 4 = 11
C = Last digit of $\overline{C}$ = 1
$\overline{K}$ = 3rd digit of PIN × 2 = 7 × 2 = 14
K = Last digit of $\overline{K}$ = 4
$\overline{B}$ = 4th digit of PIN × 4 = 9 × 4 = 36
B = Last digit of $\overline{B}$ = 6
$\overline{D}$ = 5th digit of PIN + 2 = 1 + 2 = 3
D = Last digit of $\overline{D}$ = 3
$\overline{E}$ = 6th digit of PIN + 3 = 9 + 3 = 12
E = Last digit of $\overline{E}$ = 2
$\overline{T}$ is a time related variable: $\overline{T}$ = [1st digit of date + (2 × 2nd digit of date) + 3rd digit of date + 4th digit of date + (2 × 5 digit of date) + 6th digit of date + (3 × 7th digit of date)] × sum of last five digits of date = [0 + 14 + 1 + 6 + 18 + 1 + 3] × [7 + 3 + 0 + 1 + 0] = 473
T = Last digit of $\overline{T}$ = 3
$\overline{TPIN}$ = [(0 + 1)1 + (3 + 1)2 + (6 + 1)(4 × 3)] × 3 + (1 × 3) + 4 = 286
TPIN = Last three digits of $\overline{TPIN}$ = 286

The above calculations require a calculating circuit of only limited capacity, which can be programmed or installed as a dedicated processor at low cost.

FIG. 2 is a block diagram which shows how a TPIN can be used to verify authority. In a first step 50, a person enters his name into his computer. The name may be entered only once into the computer, and thereafter used by the computer every time access to a particular data base is requested, where only that person uses that computer. Where several different people use the computer and each has a different password or PIN, then the person enters his name by way of a keyboard, every time he uses the computer to gain access to the data base. A second step 52 is the inputting of a six digit PIN, which can either be done once and kept in memory by the computer, or entered each time as in the case of the person's name. A third step 54 is to generate a twelve digit number representing the present time, which is generally entered by an internal computer clock, although it can be entered from an external source such as the verifying station.

The six digit PIN entered at 52 and the twelve digit number indicating the present time entered at 54, are entered into a calculating circuit at the beginning of step 56. The calculating circuit generates a three digit TPIN based on the six digit PIN and the number representing the present time, as by the algorithm given above as equation one. In a next step 58, the computer transmits over a telephone line or other information channel, the calculated TPIN, the present time entered at step 54, and the name of the authorized user entered at 50, this information being transmitted to the verifying station which receives this information at step 60.

When the verifying station receives the TPIN, the time for which the TPIN was calculated, and the name of the user, the station performs the next step 62 which is to look up the PIN for that name. In the above example, at step 62 the verifying station will enter the name "Robert N. Ward" into a lookup table, and produce a corresponding stored PIN'which is "977919". In a next step 64, a calculating circuit of the verifying station calculates TPIN' based on the stored PIN' and the time received at step 60 from the alleged authorized user. The calculating circuit generates a TPIN', which is the translated pin for the stored PIN' for that name. In a next step 66, the verifying station compares the TPIN received on the telephone line from the alleged authorized user with the TPIN' which the verifying station calculates. In step 70, the TPIN and TPIN' were found to be identical and the alleged authorized user is allowed access to the computer network. In an alternative step 72, the TPIN and TPIN' are found to not be identical and access is denied to the alleged authorized user.

The verifying station and the authorized user's computer can each have accurate clocks, and the verifying station can reject any request for access which gives a time different from the present time by more than a predetermined amount such as a few seconds. However, where it is not convenient to keep the time of the authorized station exactly the same as that of the verifying station, or to account for differences in time in different time zones, the verifying station can be programmed to prevent a particular authorized user from using the same time twice. That is, once the authorized user has transmitted a TPIN and the time he used in calculating of the TPIN, the verifying station may prevent later access which uses the same time. It may be realized from the above, that the use of time in the calculation of a TPIN is arbitrary, and any nonrepeating number could be used instead. For example, the computer of the authorized user could generate a multi-digit random number or even numbers in sequence, which could be used instead of time to calculate the TPIN from the PIN, and could transmit to the verifying station the particular multi-digit number used each time in calculating the TPIN. It is usually easiest to merely use a number representing the present time, but since any nonrepeating numbers can be used instead, the term "time number" is used herein to include any nonrepeating numbers.

While it is possible for the verifying station to keep track of every time number used by each authorized user, and to prevent the same number from being used twice, this can require considerable memory. Another approach is to have the verifying station generate a new time number every time it is called by an alleged authorized user, and for the verifying station to transmit that time number to the alleged authorized user. The user (his computer) then uses his PIN and the time number received from the verifying station to generate a TPIN which the user transmits to the verifying station.

In some situations, the same password is used by all authorized users of a particular data base. Such a password may include letters and/or numbers, and any such string of alphanumeric characters may be herein referred to as a "number". In cases where the same number is used by all authorized users of a data base, it has generally been necessary only for the user to transmit such a password number (not his name). In the present invention, the user uses the password number or "PIN" (which now refers to a "password identification number") and the time number (or other nonrepeating number) to generate a TPIN (translated password identification number). The algorithm provided above in equation one can be used. In this case, the verifying station which receives the TPIN and knows the time number, uses the actual PIN' known to the verifying station and the time number received from or sent to the alleged authorized user to generate a TPIN' which it compares to the TPIN received over the telephone line.

Thus, the invention provides a system for using a PIN along with a time number, to enable a verifying station to verify that an alleged authorized user does have authority to gain access to a data bank. The PIN and time number are used by an authorized user to generate a TPIN which can be transmitted over unsecure lines to the verifying station. The verifying station uses the PIN stored in its memory and the time number transmitted or received over the telephone line, to generate a TPIN'. The verifying station compares the TPIN' it generates with the received TPIN, to determine if there is correspondence or not. The PIN may be unique to each of many different authorized users of a data base, and each authorized user transmits his identification I.D. (such as his name) to enable the verifying station to use the I.D. to determine the true PIN, or PIN', of that user. In a system where all users use the same PIN, it may not be necessary for the authorized user to transmit his name. A number designated as "time" may be a number representing the actual present time, or may be any multi-digit number that is unlikely to repeat. The verifying station can refuse access when it receives any time number that has been previously used. Alternately, the time number can be initially generated by the verifying station. The present system is useful for a wide variety of data bases, including those that provide access to a computer network storing large amounts of data, a voice mail system enabling an authorized user to transmit messages to many others, or a credit card system wherein the verifying station authorizes a charge on a credit card if the alleged authorized user is verified and his credit balance is sufficient.

Although particular embodiments of the invention have been described and illustrated herein, it is recognized that modifications and variations may readily occur to those skilled in the art, and consequently it is intended that the claims be interpreted to cover such modifications and equivalents.

I claim:

1. A method for verifying the authority of an alleged authorized party comprising:

entering an identification number, or PIN, of a given number of digits, and a time number, into a calculating circuit at an authorized party, and using said calculating circuit to generate a translated pin, or TPIN, according to an algorithm based on said PIN and said time number;

transmitting said TPIN to a verifying station that knows said time number;

generating a TPIN at said station based at least in part on said time number and a true PIN known by said station, and comparing said TPIN received by said station and said TPIN generated at said station, and verifying authority of said party only upon their matching;

said TPIN has fewer digits than said PIN, thereby avoiding a substantially one-to-one correspondence of each PIN and TPIN.

2. The method as described in claim 1 wherein:

said TPIN has sufficiently fewer digits than said PIN, that there are at least one hundred PINS that could generate the same TPIN using the same time number and algorithm.

3. The method described in claim 1 wherein:

said step of transmitting includes transmitting an identification, or I.D., identifying an authorized party;

said step of generating a TPIN at said station includes obtaining, from a memory at said verifying station, a PIN corresponding to the identification of the authorized user, and using said PIN obtained from the memory at said verifying station plus said time number to calculate said TPIN generated at said verifying station.

4. The method described in claim 1 wherein:

said PIN is the same for all of a plurality of authorized parties, and said step of generating a TPIN at said station includes obtaining said PIN from a memory at said verifying station and using said PIN obtaining from the memory at said verifying station plus said time number to calculate said TPIN generated at said verifying station.

5. The method described in claim 1 including:

initially generating said time number at said verifying station and transmitting said time number to said authorized party for use in generating said TPIN by said calculating circuit of said user.

6. Apparatus for enabling a person, computer or other PIN-holder that knows a personal or password identification number, or PIN, to generate a number that can be transmitted to a verifying authority that can verify that that PIN-holder knows that PIN, while preventing a person who intercepts the transmitted number from gaining access to the PIN, comprising:

a calculating circuit of a user, which can receive a PIN and a substantially nonrepeating time number, said calculating circuit being constructed to generate a translated pin, or TPIN, according to an algorithm based on the received PIN and the time number, with the TPIN having fewer digits than said PIN, thereby avoiding a substantially one-to-one correspondence between each PIN and a TPIN and to assure that the TPIN repeatedly changes.

7. The apparatus described in claim 6 wherein:

said algorithm of said calculating circuit generates a TPIN of three digits based upon a PIN of six digits and the time number.

8. The apparatus described in claim 6 including:

a verifying station which stores at least one PIN, said verifying station being constructed to receive the TPIN and to know the time number used in calculating the TPIN;

said verifying station being constructed to calculate a TPIN based on a PIN stored in the verifying station and the same time number used by said calculating circuit of said user, to compare the TPIN calculated by said station to the TPIN received from the alleged PIN-holder, and to provide access to information only if said TPINS are the same.

9. The apparatus described in claim 6 including:

a verifying station which stores the PIN of each of a plurality of authorized PIN-holders, said verifying station being constructed to receive an identification of an alleged PIN-holder and a TPIN from that PIN-holder;

said verifying station being constructed to calculate the TPIN of an alleged PIN-holder based on the PIN stored in the verifying station for the identification of the alleged PIN-holder and the same time number used by the alleged PIN-holder, to compare the TPIN calculated by said station to the TPIN received from the alleged PIN-holder, and to provide access to information only if said TPINs are the same.

10. The apparatus described in claim 8 or 9 wherein:

said calculating circuit of said user is constructed to initially generate said time number and to transmit it to said verifying station;

said verifying station is constructed to refuse access to information to an alleged PIN-holder from whom a TPIN and time number are received, when the received time number is the same as an earlier received time number from that alleged PIN-holder which resulted in the verifying station granting access to information.

11. The apparatus described in claim 8 or 9 wherein:

said verifying station is constructed to initially generate said time number and transmit it to said calculating circuit of said user.

12. The apparatus described in claim 6 wherein:

said computing circuit has a keyboard into which said PIN can be entered.

13. The apparatus described in claim 6 wherein:

said apparatus includes a memory which stores said PIN and delivers it to said calculating circuit.

* * * * *